United States Patent
Hofmann et al.

(10) Patent No.: US 6,780,813 B1
(45) Date of Patent: Aug. 24, 2004

(54) PROCESS FOR PRODUCING DMC CATALYSTS

(75) Inventors: Jörg Hofmann, Krefeld (DE); Bernd Klinksiek, Bergisch Gladbach (DE); Stephan Ehlers, Leverkusen (DE); Thorsten Fechtel, Köln (DE); Franz Föhles, Tönisvorst (DE); Pieter Ooms, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/148,555

(22) PCT Filed: Nov. 21, 2000

(86) PCT No.: PCT/EP00/11835

§ 371 (c)(1),
(2), (4) Date: May 30, 2002

(87) PCT Pub. No.: WO01/39883

PCT Pub. Date: Jun. 7, 2001

(30) Foreign Application Priority Data

Dec. 3, 1999 (DE) .......................................... 199 58 355

(51) Int. Cl.[7] .............................................. B01J 27/26
(52) U.S. Cl. ...................... 502/175; 502/159; 502/200; 568/613; 568/621; 568/620; 525/409; 525/403; 525/412; 525/414; 525/415; 525/419; 525/421
(58) Field of Search ................................ 502/175, 200, 502/159; 568/613, 621, 620; 525/409; 528/403, 412, 414, 415, 419, 421

(56) References Cited

U.S. PATENT DOCUMENTS

| | | | |
|---|---|---|---|
| 3,404,109 A | 10/1968 | Milgrom ..................... | 260/611 |
| 3,829,505 A | 8/1974 | Herold ..................... | 260/611 B |
| 3,941,849 A | 3/1976 | Herold ..................... | 260/607 A |
| 4,253,610 A * | 3/1981 | Larkin ........................ | 239/430 |
| 4,406,664 A * | 9/1983 | Burgess et al. ............... | 44/280 |
| 5,158,922 A | 10/1992 | Hinney et al. ............... | 502/175 |
| 5,470,813 A | 11/1995 | Le-Khac ..................... | 502/175 |
| 5,482,908 A | 1/1996 | Le-Khac ..................... | 502/156 |
| 5,545,601 A | 8/1996 | Le-Khac ..................... | 502/156 |
| 5,627,120 A | 5/1997 | Le-Khac ..................... | 502/156 |
| 5,714,428 A | 2/1998 | Le-Khac ..................... | 502/159 |
| 5,803,600 A | 9/1998 | Schubert et al. ............ | 356/144 |
| 5,891,818 A | 4/1999 | Soltani-Ahmadi .......... | 502/175 |
| 5,900,384 A | 5/1999 | Soltani-Ahmadi et al. .. | 502/175 |
| 6,018,017 A | 1/2000 | Le-Khac ..................... | 528/421 |
| 6,323,375 B1 | 11/2001 | Hofmann et al. ........... | 568/613 |
| 2002/0057627 A1 | 5/2002 | Schubert et al. | |

FOREIGN PATENT DOCUMENTS

| | | |
|---|---|---|
| CA | 2302984 | 9/2000 |
| JP | 4-145123 | 5/1992 |
| WO | 97/40086 | 10/1997 |
| WO | 98/16310 | 4/1998 |
| WO | 99/19063 | 4/1999 |

* cited by examiner

*Primary Examiner*—Elizabeth D. Wood
(74) *Attorney, Agent, or Firm*—Joseph C. Gil; John E. Mrozinski, Jr.

(57) ABSTRACT

The invention relates to an improved method of producing double-metal cyanide (DMC) catalysts for the production of polyether polyols by polyaddition of alkylene oxides to starter compounds containing active hydrogen atoms, in which the DMC catalyst dispersion is produced using a mixing nozzle, preferably a jet disperser. The DMC catalysts produced in this way have an increased activity in polyether polyol production, reduced particle size and narrower particle size distribution.

14 Claims, 3 Drawing Sheets

PROCESS FOR PRODUCING DMC CATALYSTS

TECHNICAL FIELD OF THE INVENTION

The invention relates to an improved method of producing double metal cyanide (DMC) catalysts for the production of polyether polyols by polyaddition of alkylene oxides to starter compounds containing active hydrogen atoms.

BACKGROUND OF THE INVENTION

Double metal cyanide (DMC) catalysts for the polyaddition of alkylene oxides to starter compounds containing active hydrogen atoms have been known for a long time (see, for example, U.S. Pat. Nos. 3,404,109, 3,829,505, 3,941,849 and 5,158,922). The use of said DMC catalysts for the production of polyether polyols effects, in particular, a reduction of the proportion of monofunctional polyethers having terminal double bonds, so-called monools, compared with the conventional production of polyether polyols by means of alkali catalysts, such as alkali hydroxides. The polyether polyols thus obtained can be processed to form high-quality polyurethanes (for example, elastomers, foams, coatings).

DMC catalysts are usually obtained by reacting an aqueous solution of a metal salt with the aqueous solution of a metal cyanide salt in the presence of an organic complex ligand, for example an ether. In a typical catalyst preparation, for example, aqueous solutions of zinc chloride (in excess) and potassium hexacyanocobaltate are mixed and dimethoxyethane (glyme) is then added to the dispersion formed. After filtering and washing the catalyst with aqueous glyme solution, an active catalyst of the general formula

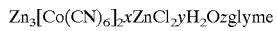

$$Zn_3[Co(CN)_6]_2 \cdot xZnCl_2 \cdot yH_2O \cdot z\text{glyme}$$

is obtained (see, for example, EP-A 700 949).

The conventional method of producing DMC catalysts is to mix aqueous solutions of a metal salt and a metal cyanide salt in a stirred reactor in the presence of one or more organic complex ligands with the formation of a catalyst dispersion. In order to achieve high catalyst activity, vigorous stirring with high shear is in general necessary. A disadvantage of this is that, if large stirred reactors are used, a high energy expenditure is necessary because of low power densities and a severely non-uniform power density distribution is present. Normally, the power density of stirred reactors is about $10^4$ W/m$^3$. A further disadvantage is that foam formation occurs in the reactor during vigorous stirring, which results in a reduction of catalyst yield and activity.

U.S. Pat. No. 5,891,818 describes an improved method of producing DMC catalysts with increased catalyst yield and activity, and also reduced particle size, in which the DMC catalyst dispersion is produced in a stirred reactor, wherein some of the catalyst dispersion circulates and is sprayed into the reactor head space and the circulating flow is conveyed through a "high-shear in-line mixer". This is to be understood as meaning, for example, a high speed rotor-stator mixer. A disadvantage of this method is that the foam formation cannot be completely suppressed and that repeated circulation of the entire reactor content through the "high-shear in-line mixer" is necessary in order to achieve uniform catalyst activity and particle size. Furthermore, the energy expenditure necessary for the stirring is very high and the combination of a stirred reactor with a circulation loop, a "high-shear in-line mixer" and spray nozzles is expensive in terms of equipment.

SUMMARY OF THE INVENTION

It has now been found that DMC catalysts having a further increased activity, reduced particle size and narrower particle size distribution can be obtained if the DMC catalyst dispersion is produced using a mixing nozzle, preferably a jet disperser. Further advantages of this method compared with the method variant described in U.S. Pat. No. 5,891,818 are the lower energy expenditure during the shearing, the higher power density (approximately $10^{13}$ W/m$^3$) compared with the use of a stirred tank, the problem-free extrapolation to a larger scale and the markedly simplified equipment construction as a result of the omission of the stirred reactor. Polyether polyols that are obtained by means of DMC catalysts that are produced by this method have, in addition, a reduced viscosity compared with polyether polyols that are obtained by means of DMC catalysts that are produced by the method described in U.S. Pat. No. 5,891,818.

DETAILED DESCRIPTION OF THE INVENTION

Figure 1:
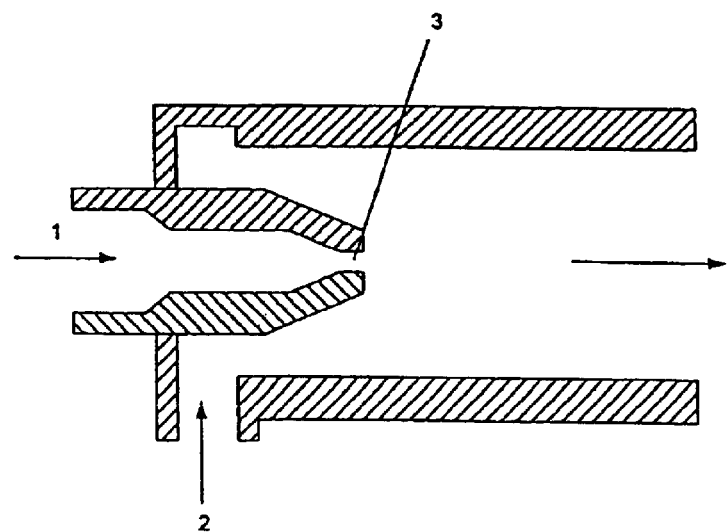
FIG. 1 is a front cross-sectional view of a flat jet nozzle.

The present invention therefore provides an improved method of producing DMC catalysts, in which solutions of water-soluble salts of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) or Cr(III) are mixed with solutions of water-soluble salts or acids, containing cyanide ions, of Fe(II), Fe(III), Co(II), Co(III), Cr(II), Cr(III), Mn(II), Mn(III), Ir(III), Ni(II), Rh(III), Ru(II), V(IV) or V(V) using a mixing nozzle, preferably a jet disperser.

The double metal cyanide compounds contained in the DMC catalysts suitable for the method according to the invention are the reaction products of water-soluble metal salts and water-soluble metal cyanide salts.

Water-soluble metal salts suitable for producing the double metal cyanide compounds preferably have the general Formula (I)

$$M(X)_n \qquad (I),$$

wherein M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Particularly preferred are Zn(II), Fe(II), Co(II) and Ni(II). X denotes identical or different, preferably identical anions, preferably selected from the group comprising the halides, hydroxides, sulfates, carbonates, cyanates, thiocyanates, isocyanates, isothiocyanates, carboxylates, oxalates and nitrates. The value of n is 1, 2 or 3.

Examples of suitable water-soluble metal salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of various water soluble metal salts can also be used.

Water-soluble metal cyanide salts suitable for producing the double metal cyanide compounds preferably have the general Formula (II)

$$(Y)_a M'(CN)_b (A)_c \qquad (II),$$

wherein M' is selected from the metals Fe(II), Fe(III), Co(II), Co(III), Cr(II), Cr(III), Mn(II), Mn(III), Ir(II), Ni(II), Rh(III), Ru(II), V(IV) and V(V). Particularly preferably, M' is selected from the metals Co(II), Co(III), Fe(II), Fe(III), Cr(III), Ir(III) and Ni(II). The water-soluble metal cyanide salt may contain one or more of said metals. Y denotes identical or different, preferably identical alkali metal cations or alkaline-earth metal cations. A denotes identical or different, preferably identical anions, selected from the group comprising the halides, hydroxides, sulfates, carbonates, cyanates, thiocyanates, isocyanates, isothiocyanates, carboxylates, oxalates or nitrates. Both a and b and c are integers, wherein the values of a, b and c are chosen so that the metal cyanide salt is electroneutral; a is preferably 1, 2, 3 or 4; b is preferably 4, 5 or 6; c preferably has the value 0. Examples of suitable water-soluble metal cyanide salts are potassium hexacyanocobaltate(M), potassium hexacyanoferrate(II), potassium hexacyanoferrate(III), calcium hexacyanocobaltate(III) and lithium hexacyanocobaltate(III).

Instead of alkali or alkaline-earth metal cyanide salts, the corresponding acids can also be used. Said acids may, for example, be obtained by cation exchange from the alkali or alkaline-earth metal cyanide salts, e.g. by means of cation-exchange resins.

Preferred double metal cyanide compounds contained in the DMC catalysts are compounds of the general Formula (III)

$$M_x[M'_{x'}(CN)_y]_z \qquad (III),$$

wherein M is defined as in Formula (I) and M' is defined as in Formula (II), and x, x', y and z are integers and are chosen so that the double metal cyanide compound is electroneutral. Preferably, x=3, x'=1, y=6 and z=2, M=Zn(II), Fe(II), Co(II) or Ni(II) and M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds are to be found in, for example, U.S. Pat. No. 5,158,922 (column 8, lines 29–66). Zinc hexacyanocobaltate(III) is particularly preferably used.

The organic complex ligands a) contained in the DMC catalysts suitable for the method according to the invention are known in principle and described extensively in the prior art (see, for example, U.S. Pat. No. 5,158,922, column 6, lines 9–65, U.S. Pat. Nos. 3,404,109, 3,829,505, 3,941,849, EP-A 0 700 949, EP-A 761 708, JP-A 4 145 123, U.S. Pat. No. 5,470,813, EP-A 743 093 and WO 97/40086). Preferred organic complex ligands a) are water-soluble organic compounds containing heteroatoms, such as oxygen, nitrogen, phosphorous or sulfur that can form complexes with the double metal cyanide compound. Suitable organic complex ligands are, for example, alcohols, aldehydes, ketones, ethers, esters, amides, ureas, nitrites, sulfides and mixtures thereof. Preferred organic complex ligands are water-soluble aliphatic alcohols, such as ethanol, isopropanol, n-butanol, isobutanol, sec-butanol and tert-butanol. Particularly preferred is tert-butanol.

The organic complex ligand a) is added either during the preparation of the catalyst or directly after formation of the dispersion of the double metal cyanide compound. Usually, the organic complex ligand a) is used in excess.

Preferred for the method according to the invention are DMC catalysts that contain, in addition to the organic complex ligands a) cited above, also a further organic complex-forming component b). Said component b) may be selected from the same classes of compounds as complex ligand a). Preferably, component b) is a polyether, polyester, polycarbonate, glycidyl ether, glucoside, carboxylates of polyhydric alcohols, polyalkylene glycol sorbitan ester, a bile acid or its salt, ester or amide, a cyclodextrin, organic phosphate, phosphite, phosphonate, phosphonite, phosphinate or phosphinite, an organic surfactant or interface-active compound or an α,β-unsaturated carboxylic ester. DMC catalysts with such ligand combinations are described, for example, in EP-A 700 949, EP-A 761 708, WO 97/40086, WO 98/08073, WO 98/16310, WO 99/01203, WO 99/19062, WO 99/19063 or German Patent Application 19905611.0.

The DMC catalysts suitable for the method according to the invention may optionally also contain water and/or one or more water-soluble metal salts of the Formula (I) from the production of the double metal cyanide compound.

According to the invention, the DMC catalyst dispersion is produced using a mixing nozzle (for example, a flat jet nozzle, Levos nozzle, Bosch nozzle and the like), preferably using a jet disperser.

The basic structure and the mode of operation of suitable mixing elements will be described below. FIG. 1 shows the diagrammatic structure of a simple flat jet nozzle. The educt flow 1 is first accelerated in the nozzle 3 and sprayed at high flow velocity into the slow-flowing educt flow 2. In this process, educt flow 2 is accelerated and educt flow 1 retarded. Some of the kinetic energy of educt flow 1 is converted into heat during this process and is consequently no longer available for the mixing process. The two educt flows are then mixed by means of the turbulent disintegration of the resulting jet into vortexes of various size (vortex cascade). Compared with the stirred tank, concentration differences can be eliminated in this way markedly more quickly since markedly greater and more homogeneous power densities can be achieved. In this connection, the power density P is calculated using the following formula:

$$P = \frac{\Delta p * \dot{V}}{V}$$

where:

Δp is the pressure loss in the nozzle, $\dot{V}$ is volumetric flow,

V is the volume of the nozzle bore.

The use of such nozzles will be denoted as Method 1 below.

Figure 2:
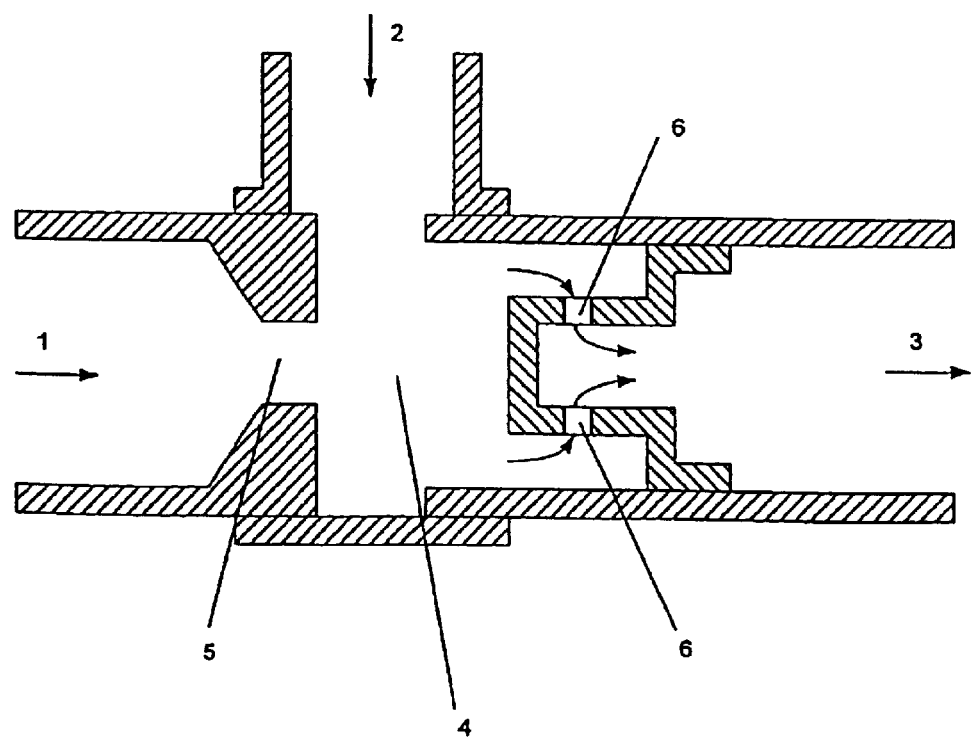
FIG. 2 is a front cross-sectional view of a jet disperser having two nozzles with one nozzle disposed behind the other.
Figure 3:
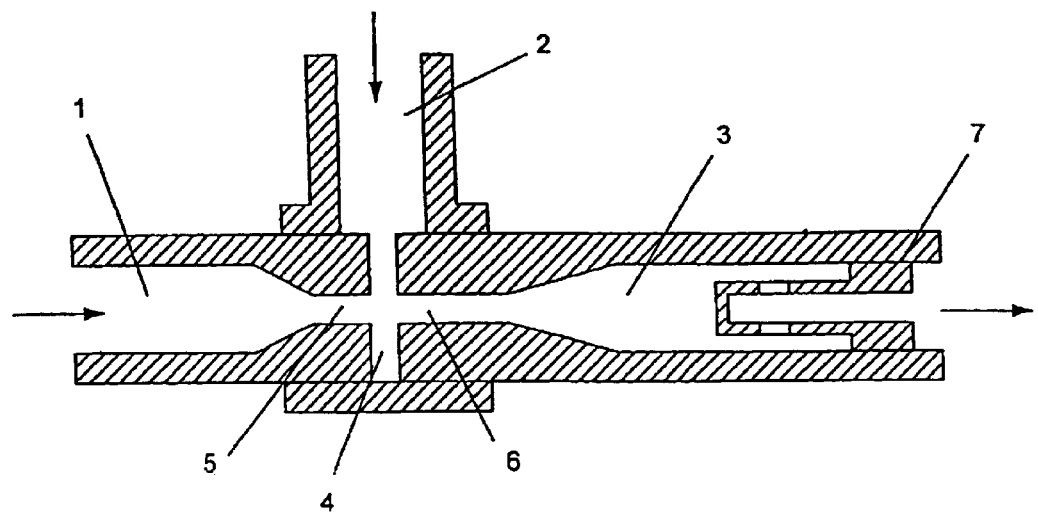
FIG. 3 is a front cross-sectional view of a multistage jet disperser.

Preferably, however, a jet disperser such as that shown in FIG. 2 or FIG. 3 should be used for the method according to the invention. The jet disperser can be constructed (FIG. 2) so that two nozzles 5 and 6 are disposed one behind the other. The educt flow 1 is initially considerably accelerated in the nozzle 5 by the reduction in cross section. In this connection, because of the high flow velocity the accelerated jet sucks in the second component. The distance between the nozzles is preferably chosen so that, because of the short residence time, only nucleus formation, but no crystal growth, takes place in the mixing chamber 4. Crucial for the optimum design of the jet disperser is consequently the rate of nucleus formation of the solid. Advantageously, a residence time of 0.0001 s to 0.15 s, preferably 0.001 s to 0.1 s is established. The crystal growth only takes place in the outlet 3. The diameter of the nozzles 6 is preferably chosen so that a further acceleration of the partially mixed educt flows takes place at that point. Because of the shear forces additionally occurring as a result in the nozzles 6, the state of homogeneous mixing by a more rapid vortex disintegration is achieved in a shorter time than in Method 1. As a result, in contrast to Method 1, it is possible to achieve the state of ideal mixing of the educts even in the case of precipitation reactions with very high nucleus formation rate, with the result that the establishment of defined stoichiometric compositions is possible during the precipitation reaction. Nozzle diameters of 5000 µm to 50 µm, preferably 2000 µm to 200 µm have proved advantageous, with pressure losses in the nozzle of 0.1 bar to 1000 bar or power densities in the range from $1*10^7$ W/m$^3$ to $1*10^{13}$ W/m$^3$. This mixing operation will be designated as Method 2 below.

Depending on the desired particle size, a further n nozzles (where n=1–5) can be connected downstream so that a multistage jet disperser is obtained. FIG. 3 shows such a multistage jet disperser. Following the nozzle 6, the dispersion is fed yet again through the nozzle 7. The same applies to the design of the nozzle diameter as for nozzle 6.

The additional advantage of further dispersers over method 2 is that particles already formed can be mechanically comminuted by the high shear forces in the nozzles. In this way, it is possible to produce particles having diameters of 10 µm to 0.1 µm. Instead of a plurality of nozzles connected one behind the other, the cominution may, however, also be achieved by circulating the dispersion. The use of such nozzles is characterized as Method 3 below.

Other mixing elements can likewise be used to produce dispersions, such as those described in EP-A 101 007, WO 95/30476 or German Patent Application 199 28 123.8, or combinations of said mixing elements.

As a result of the energy dissipation in the nozzles and as a result of the enthalpy of crystallization, heating of the dispersion may occur. Since the temperature may have a substantial influence on the process of crystal formation, a heat exchanger may be installed behind the mixing element for the purpose of isothermal processing.

A problem-free scale-up is possible, for example, as a result of using a larger number of bores, connecting a plurality of mixing elements in parallel or increasing the free nozzle area. However, the latter is not achieved by an increase in the nozzle diameter since, in this way, there is a possibility of the occurrence of a core flow, which results in a deterioration of the mixing result. In the case of nozzles having large clear nozzle areas, therefore, slots having an equivalent area are preferably used.

Figure 4:
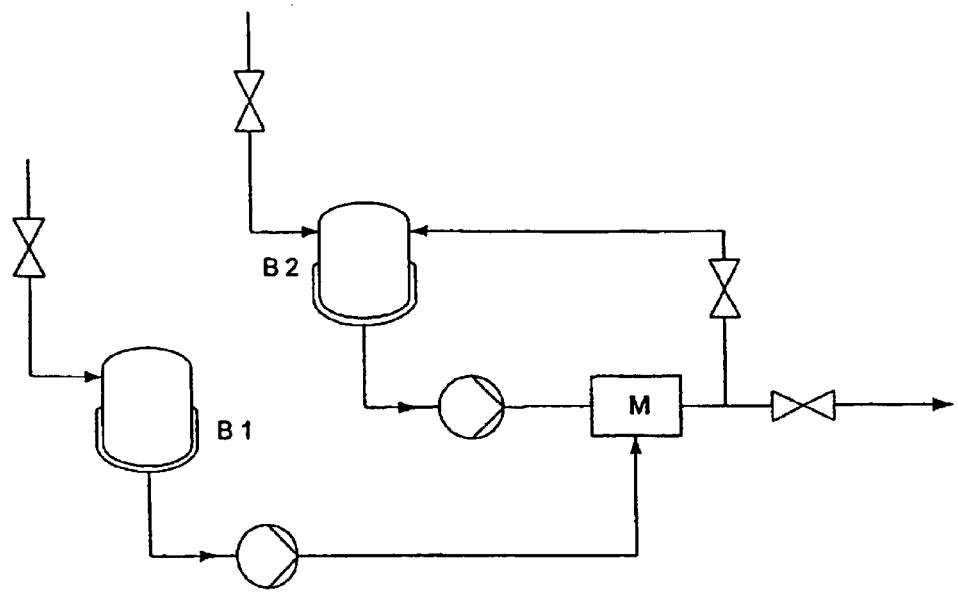
FIG. 4 is a schematic drawing of a semi-batch process for producing a double-metal cyanide catalyst dispersion.
Figure 5:
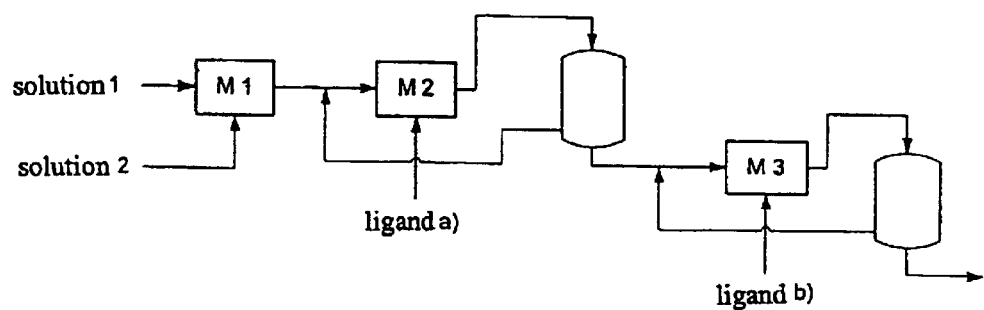
FIG. 5 is a schematic drawing of a continuous process for producing a double-metal cyanide catalyst dispersion.

The DMC catalyst dispersion is produced according to the invention using a mixing nozzle, preferably a jet disperser. Examples of suitable equipment are shown in FIGS. 4 and 5. FIG. 4 shows a semi-batch method using a loop reactor and FIG. 5 shows a continuous method for producing the DMC catalyst dispersion.

The DMC catalyst dispersion is produced by the method according to the invention normally in aqueous solution by reacting α) metal salts, in particular of the Formula (I) with β) metal cyanide salts, in particular of the Formula (II) or the corresponding acids, γ) organic complex ligands a), and, optionally, δ) one or more further organic complex-forming components b).

In this process, the aqueous solutions of the metal salt, for example zinc chloride, used in stoichiometric excess (at least 50 mol-% relative to the metal cyanide salt) and of the metal cyanide salt, for example potassium hexacyanocobaltate (or the corresponding acids), are preferably first reacted in the presence of the organic complex ligand a), which may be, for example, tert-butanol, wherein a dispersion is formed. According to the invention, said DMC catalyst dispersion is produced using a mixing nozzle, preferably a jet disperser.

The production of the DMC catalyst dispersion by the semi-batch method using a jet disperser in combination with a loop reactor (in accordance with FIG. 4) is explained below. In this connection, either the aqueous metal salt solution can be circulated from the container B2 and the aqueous metal cyanide solution can be added from container B1 or vice versa. Combining the two flows in the mixing element M results in the formation of a dispersion of the DMC compound. The dispersion of the DMC compound can be produced by Method 1, 2 or 3, preferably by Method 2 or 3. The advantage of these methods is the possibility of achieving a constant educt ratio during the entire precipitation process.

Preferably, the dispersion formed is also circulated for a few minutes to several hours through the jet disperser after the precipitation.

In this connection, the nozzle diameters are preferably between 2000 µm to 200 µm, with pressure losses in the nozzle of between 0.1 bar to 1000 bar.

In this connection, the organic complex ligand a) may be present in the aqueous solution of the metal salt and/or of the metal cyanide salt, or it is added directly (via container B1 or B2) to the dispersion obtained after precipitating the double metal cyanide compound Preferably, yet a further organic complex-forming component b) is then added via container B1 or B2 to the dispersion circulating through the jet disperser. In this connection, the further organic complex-forming component b) is preferably used in a mixture of water and organic complex ligand a).

The metered addition of the further organic complex-forming component b) to the circuit and a subsequent recirculation preferably take place with pressure losses in the nozzle of between 0.001 bar and 10 bar.

According to the invention, the DMC catalyst dispersion can also be produced in a continuous method, such as is shown by way of example in FIG. 5. The aqueous solutions of the metal salt and of the metal cyanide salt are reacted by Method 1, 2 or 3 in mixing element M1, wherein a dispersion is formed. In this connection, the organic complex ligand a) may be present in the aqueous solution of the metal salt and/or of the metal cyanide salt. In that case, the mixing stage M2 in FIG. 5 is unnecessary. It is also possible to add the organic complex ligand a) via the mixing element M2 after the precipitation of the double metal cyanide compound. To increase the residence time of the dispersion, the latter can be circulated via the mixing element M2. Following this, the further organic complex-forming component b)—preferably in a mixture of water and organic complex ligand a)—can be added in the mixing element M3 and recirculated to increase the residence time.

The catalyst is isolated from the dispersion by known techniques, such as centrifugation or filtration. In a preferred embodiment variant, the isolated catalyst is then washed with an aqueous solution of the organic complex ligand a) (for example, by redispersion and subsequent re-isolation by filtration or centrifugation). In this way, water-soluble by-products, such as potassium chloride, can be removed from the catalyst according to the invention.

Preferably, the amount of the organic complex ligand a) in the aqueous wash solution is 40 to 80 wt. % relative to the entire solution. It is furthermore preferred to add some further organic complex-forming component b), preferably 0.5 to 5 wt. % relative to the entire solution, to the aqueous wash solution.

The washing or redispersion step can be carried out in a conventional stirred reactor. It is, however, preferable to carry out the redispersion by circulation through the jet disperser. This increases the catalyst activity further. The circulation times for the redispersion are preferably between a few minutes and several hours.

In addition, it is advantageous to wash the catalyst more than once in order to increase its activity further. For this purpose, for example, the first washing process can be repeated. It is preferable, however, to use non-aqueous solutions, for example a mixture of organic complex ligand a) and the further organic complex-forming component b), for further washing processes. The further washing steps are also preferably carried out by circulation through the jet disperser.

The washed catalyst is then dried, optionally after pulverization, at temperatures of, in general, 20–100° C. and at pressures of, in general, 0.1 mbar to normal pressure (1013 mbar).

The present invention also provides for the use of the DMC catalysts produced by the method according to the invention in a method of producing polyether polyols by polyaddition of alkylene oxides to starter compounds containing active hydrogen atoms.

Because of their extremely high activity, the DMC catalysts produced by the method according to the invention can frequently be used in very low concentrations (25 ppm and less, relative to the amount of the polyether polyol to be produced). If the polyether polyols produced in the presence of the DMC catalysts produced by the method according to the invention are used to produce polyurethanes, it is possible to dispense with removal of the catalyst from the polyether polyol without the production quality of the polyurethane obtained being adversely influenced.

EXAMPLES

Catalyst Production

Example 1

Catalyst A

A solution of 52 g of potassium hexacyanocobaltate in 910 g of distilled water is circulated in a loop reactor that contains a jet disperser in accordance with FIG. 2 (4 bores having a diameter of 0.7 mm). A solution of 162.5 g of zinc chloride in 260 g of distilled water is added thereto. Under these circumstances, the pressure loss in the jet disperser is 2.0 bar. Immediately after the precipitation, a mixture of 650 g of tert-butanol and 650 g of distilled water is added and the dispersion is circulated for 16 min with a pressure loss in the jet disperser of 2.0 bar. A mixture of 13 g of sodium cholate, 13 g of tert-butanol and 1300 g of distilled water is then added and the dispersion is then circulated for 10 min with a pressure loss in the jet disperser of 0.1 bar. The solid is isolated by filtration and then washed for 8 min with a mixture of 13 g of sodium cholate, 910 g of tert-butanol and 390 g of distilled water by circulation in a loop reactor with a pressure loss in the jet disperser of 2.0 bar. The solid is filtered again and finally washed for 8 min yet again with a mixture of 6.5 g of sodium cholate and 1300 g of tert-butanol by circulation in the loop reactor with a pressure loss in the jet disperser of 2.0 bar. After filtration, the catalyst is dried at 100° C. for 5 h in a high vacuum.

Example 2

Catalyst B

The procedure was as in Example 1, but the two washing steps were not carried out by circulation through the jet disperser in the loop reactor, but by stirring (900 rev/min) in a conventional stirred reactor.

Example 3 (Comparison)

Catalyst C

Production of the DMC catalyst in a conventional stirred reactor.

A solution of 162.5 g of zinc chloride in 260 g of distilled water is added to a solution of 52 g of potassium hexacyanocobaltate in 910 g of distilled water in a conventional stirred reactor while stirring (900 rev/min). Immediately thereafter, a mixture of 650 g of tert-butanol and 650 g of distilled water is added and the dispersion is stirred for 16 min at 900 rev/min. Then a mixture of 13 g of sodium cholate, 13 g of tert-butanol and 1300 g of distilled water is added and the mixture is stirred for 8 min at 900 rev/min. The solid is isolated by filtration and then washed for 8 min with a mixture of 13 g of sodium cholate, 910 g of tert-butanol and 390 g of distilled water while stirring (900 rev/min). The solid is filtered again and finally washed yet again for 8 min with a mixture of 6.5 g of sodium cholate and 1300 g of tert-butanol while stirring (900 rev/min). After filtration, the catalyst is dried at 100° C. for 5 h in a high vacuum.

Example 4 (Comparison)

Catalyst D

The procedure was as in Example 3 (comparison example), but, as described in U.S. Pat. No. 5,891,818, the DMC catalyst dispersion was produced in a stirred reactor and the dispersion was circulated in a circulation loop through a "high-shear in-line mixer".

The particle size and the particle size distribution of the precipitated DMC catalyst dispersion treated with ligands was determined by laser correlation spectroscopy. The results are shown in Table 1:

TABLE 1

| Example | Mean particle size | Polydispersity |
| --- | --- | --- |
| 1, 2 | 2.57 μm | 0.213 |
| 3 (Comparison example) | 4.51 μm | 0.254 |
| 4 (Comparison example) | 2.78 μm | 0.248 |

The results in Table 1 show that DMC catalysts having reduced particle size and narrower particle size distribution (polydispersity) are obtained by the method according to the invention (Examples 1 and 2) compared with DMC catalysts produced by prior art methods (Comparison Examples 3 and 4).

Production of Polyether Polyols

General Procedure 50 g of polypropylene glycol starter (molecular weight= 1000 g/mol) and 5 mg of catalyst (25 ppm, relative to the amount of the polyether polyol to be produced) are introduced under protective gas (argon) into a 500 ml pressure reactor and heated to 105° C. while stirring. Propylene oxide (approximately 5 g) is then added at once until the total pressure has risen to 2.5 bar. Further propylene oxide is only added again if an accelerated pressure drop in the reactor is observed. Said accelerated pressure drop indicates that the catalyst is activated. The remaining propylene oxide (145 g) is then added continuously at a constant total pressure of 2.5 bar. After adding the propylene oxide in its entirety and a postreaction time of 2 hours at 105° C., volatile components are distilled off at 90° C. (1 mbar) and cooling is then carried out to room temperature.

The polyether polyols obtained were characterized by determining the OH numbers, the content of double bonds and the viscosities.

The course of the reaction was tracked using time/reaction curves (propylene oxide consumption [g] vs. reaction time [min]). The induction time was determined from the point of intersection of the tangents at the steepest point of the time-reaction curve with the extended baseline of the curve. The propoxylation times determining the catalyst activity are equivalent to the time period between the catalyst activation (end of the induction period) and the end of the propylene oxide addition.

Example 5
Production of Polyether Polyol with Catalyst A (25 ppm)

| | | |
|---|---|---|
| Propoxylation time: | | 42 min |
| Polyether polyol: | OH number (mg KOH/g): | 29.7 |
| | Double-bond content (mMol/kg): | 6 |
| | Viscosity 25° C. (mPas): | 846 |

Example 6
Production of Polyether Polyol with Catalyst B (25 ppm)

| | | |
|---|---|---|
| Propoxylation time: | | 68 min |
| Polyether polyol: | OH number (mg KOH/g): | 30.3 |
| | Double-bond content (mMol/kg): | 6 |
| | Viscosity 25° C. (mPas): | 869 |

Example 7 (Comparison)
Production of Polyether Polyol with Catalyst C (25 ppm)

Under the reaction conditions described above, catalyst C (25 ppm) exhibits no activity.

Example 8 (Comparison)
Production of Polyether Polyol with Catalyst D (25 ppm)

| | | |
|---|---|---|
| Propoxylation time: | | 109 min |
| Polyether polyol: | OH number (mg KOH/g): | 30.8 |
| | Double-bond content (mMol/g): | 7 |
| | Viscosity 25° C. (mPas): | 876 |

A comparison of Examples 5 and 6 with Comparison Examples 7 and 8 show that DMC catalysts having markedly increased activity (i.e. markedly reduced propoxylation times) are obtained by the method according to the invention.

What is claimed is:

1. A process for preparing a double-metal cyanide (DMC) catalyst comprising the steps of:
   forming a DMC catalyst dispersion by combining, with a jet disperser,
      at least one solution of at least one water soluble salt of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) or Cr(III);
      at least one solution of at least one water-soluble metal cyanide salt or at least one alkali or alkaline-earth metal cyanide acid of Fe(II), Fe(III), Co(II), Co(III), Cr(II), Cr(III), Mn(II), Mn(III), Ir(III), Ni(II), Rh(III), Ru(II), V(IV) or V(V); and
   adding at least one organic complexing ligand.

2. The process of claim 1 further comprising the steps of:
   isolating the DMC catalyst from the dispersion; and
   redispersing the DMC catalyst in a solution of aqueous or anhydrous ligand with a jet disperser, wherein the aqueous or anhydrous ligand may be the same as the at least one organic complexing ligand.

3. The process of claim 2, further comprising the step of:
   isolating the DMC catalyst from the solution.

4. The process of claim 1 in which the DMC catalyst comprises zinc hexacyanocobaltate(III).

5. The process of claim 1, wherein the at least one organic complexing ligand is added during preparation of the DMC catalyst.

6. The process of claim 1, wherein the organic complexing ligand comprises tert-butanol.

7. The process of claim 2, wherein the at least one organic complexing ligand is added after redispersion of the DMC catalyst.

8. The process of claim 1, wherein the at least one organic complexing ligand is selected from the group consisting of polyethers, polyesters, polycarbonates, glycidyl ethers, glycosides, polyhydric alcohol carboxylates, polyalkylene glycol sorbitan esters bile acids or salts, esters or amides thereof, cyclodextrins, organic phosphates, phosphites, phosphonates, phosphonites, phosphinates or phosphinites, ionic surface- or interface-active compounds and $\alpha,\beta$-unsaturated carboxylic acid esters.

9. A process for preparing a double-metal cyanide (DMC) catalyst comprising the steps of:
   forming a DMC catalyst dispersion by combining, with a jet disperser,
      at least one solution of at least one water soluble salt of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) or Cr(III);
      at least one solution of at least one water-soluble metal cyanide salt or at least one alkali or alkaline-earth metal cyanide acid of Fe(II), Fe(III), Co(II), Co(III), Cr(II), Cr(III), Mn(II), Mn(III), Ir(III), Ni(II), Rh(III), Ru(II), V(IV) or V(V);
   adding at least one organic complexing ligand;
   isolating the DMC catalyst from the dispersion;
   redispersing the DMC catalyst in a solution of aqueous or anhydrous ligand with a jet disperser, wherein the aqueous or anhydrous ligand may be the same as the at least one organic complexing ligand; and
   isolating the DMC catalyst from the solution.

10. The process of claim 9 in which the DMC catalyst comprises zinc hexacyanocobaltate(III).

11. The process of claim 9, wherein the at least one organic complexing ligand is added during preparation of the DMC catalyst.

12. The process of claim 9, wherein the organic complexing ligand comprises tert-butanol.

13. The process of claim 9, wherein the at least one organic complexing ligand is added after redispersion of the DMC catalyst.

14. The process of claim 9, wherein the at least one organic complexing ligand is selected from the group consisting of polyethers, polyesters, polycarbonates, glycidyl ethers, glycosides, polyhydric alcohol carboxylates, polyalkylene glycol sorbitan esters bile acids or salts, esters or amides thereof, cyclodextrins, organic phosphates, phosphites, phosphonates, phosphonites, phosphinates or phosphinites, ionic surface- or interface-active compounds and $\alpha,\beta$-unsaturated carboxylic acid esters.

* * * * *